UNITED STATES PATENT OFFICE.

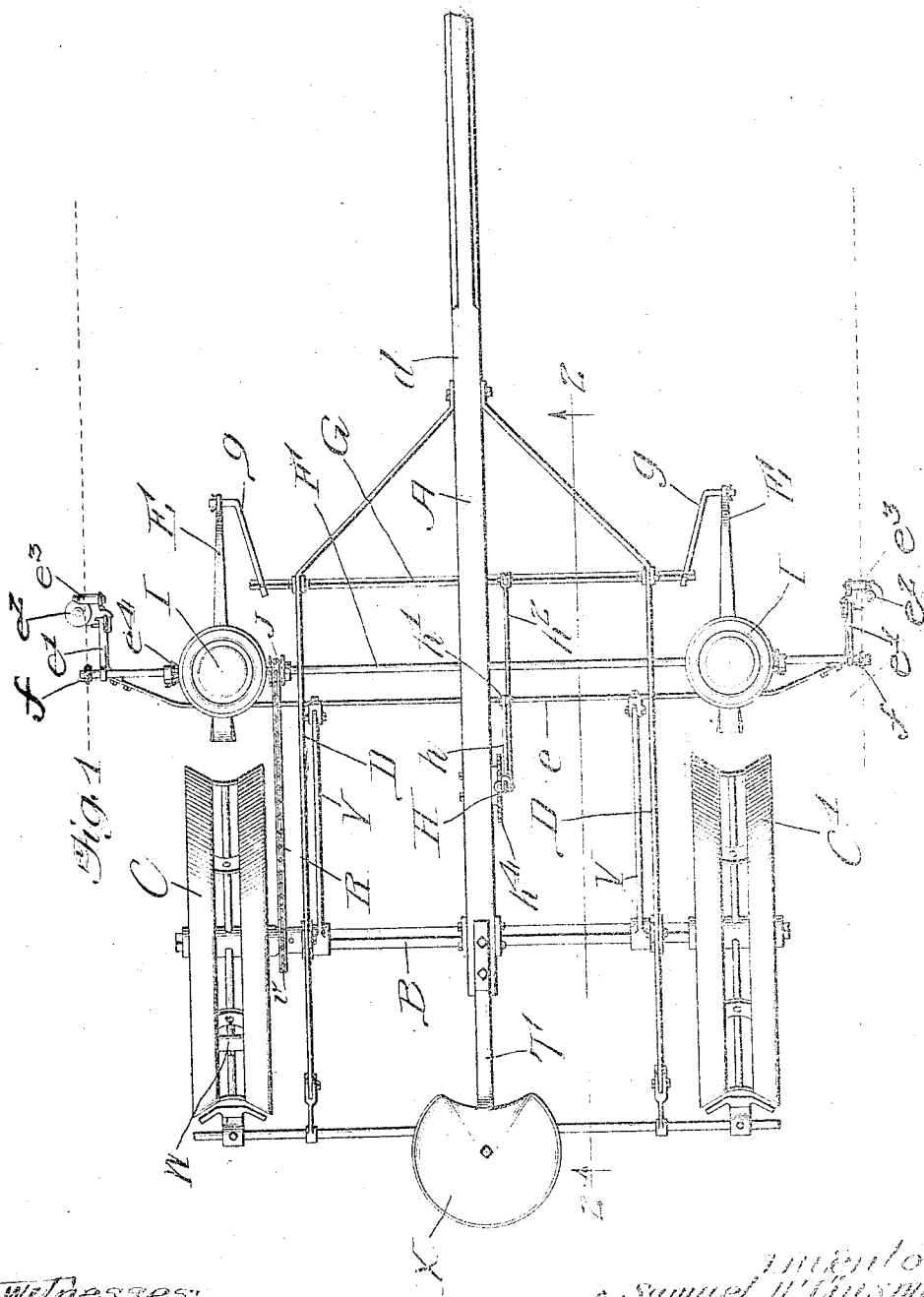

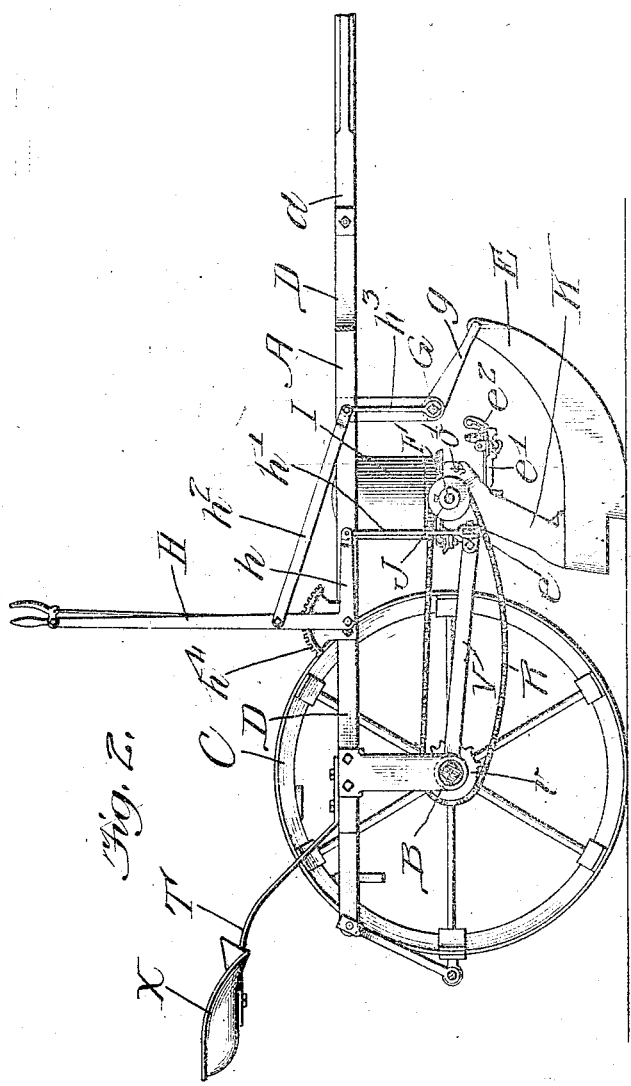

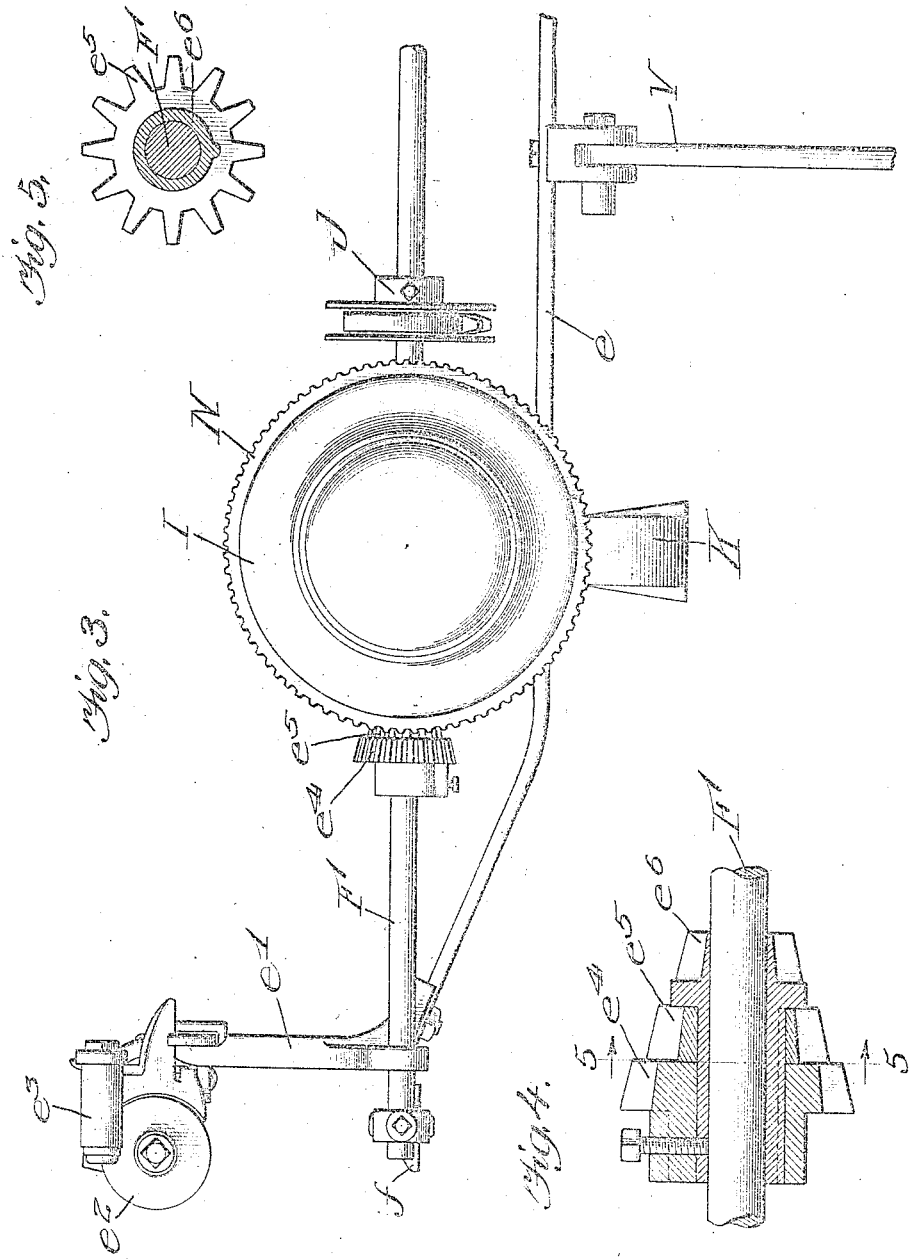

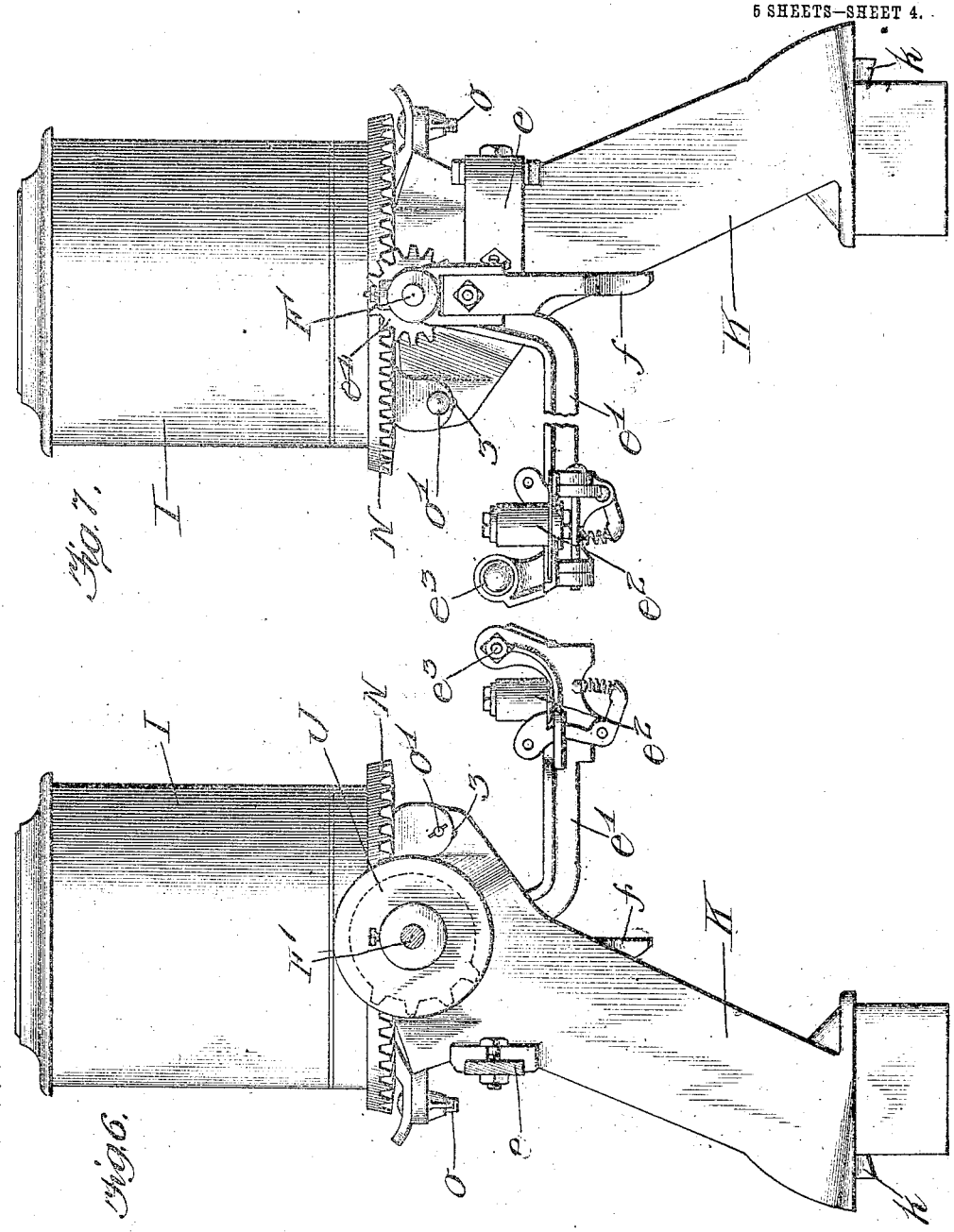

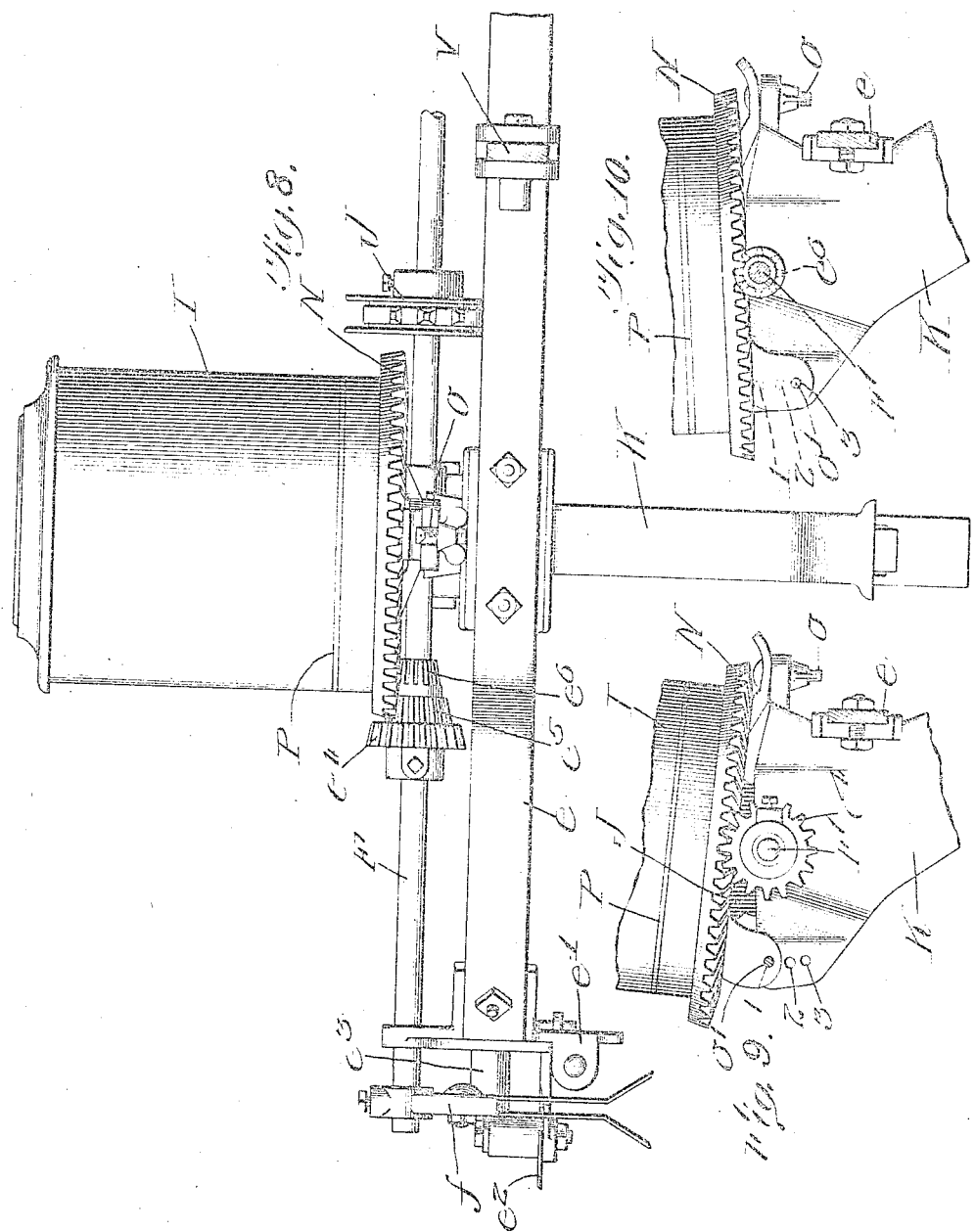

SAMUEL H. TINSMAN, OF FORT MADISON, IOWA.

PLANTER.

931,898.

Specification of Letters Patent.

Patented Aug. 24, 1909.

Application filed February 23, 1906. Serial No. 302,343.

*To all whom it may concern:*

Be it known that I, SAMUEL H. TINSMAN, a citizen of the United States of America, and resident of Fort Madison, Lee county, Iowa, have invented a certain new and useful Improvement in Planters, of which the following is a specification.

My invention relates to planting machines in general, but more particularly to machines for planting corn, and especially to what are known as check-row corn planters.

Generally stated, the object of my invention is the provision of an improved and highly efficient check-row planting machine.

A special object of my invention is to provide improved means for utilizing the forward motion of the planter for operating the seed-dropping mechanism, the check-row wire being used only for starting the said mechanism, and the check-row forks, preferably one at each end of the seed shaft, being driven interruptedly by power derived, preferably, from one of the ground wheels through the medium of a mutilated sprocket gearing, whereby the transmission of power is automatically interrupted as soon as the mutilated portion of the sprocket wheel comes in contact with the sprocket chain, and whereby the rotary seed dropping mechanism then remains inactive until another knot on the check-row wire strikes the fork, the engagement of the said knot with the fork serving to move the mutilated sprocket wheel a distance sufficient to bring its teeth into engagement with the sprocket chain, and the engagement of the fork with the knots on the check-row wire each time accomplishing a two-fold purpose, namely the starting of the rotary seed mechanism to discharge into the spout or boot of the runner a definite number of seeds or kernels of corn, and simultaneously therewith the discharge from the said spout or boot of the accumulation of seed or corn therein brought about by the previous operation of the seed mechanism.

Another object of my invention is to provide improved means for varying the speed of rotation of the seed-dropping mechanism, said means involving, as will hereinafter more fully appear, a plurality of bevel pinions of different sizes on the seed shaft, and instrumentalities whereby any one of said pinions may be brought into engagement with said seed-dropping mechanism, thus giving a variable rate of discharge from the seed box into the spout or boot of the runner, depending upon the number of kernels desired in each hill—that is to say, the bevel pinions of different diameter constitute, in combination with the devices whereby any particular pinion may be brought into operation, an arrangement for varying the number of kernels discharged for any given distance of travel of the machine, thereby making it possible to plant a greater or less number of kernels in each hill, depending upon the conditions and requirements of different users.

To the foregoing and other useful ends, my invention consists in matters hereinafter set forth and claimed.

In the accompanying drawings—Figure 1 is a plan view of a corn planter embodying the principles of my invention. Fig. 2 is a longitudinal section on line 2—2 in Fig. 1. Fig. 3 is an enlarged plan view of one of the seed-dropping mechanisms and related parts. Fig. 4 is an enlarged longitudinal section of one of the groups of nested bevel gears for driving the seed-dropping mechanism. Fig. 5 is a cross section on line 5—5 of Fig. 4. Fig. 6 is a side elevation of one of the seed-dropping mechanisms and related parts. Fig. 7 is a view of the other side of said seed-dropping mechanism. Fig. 8 is a rear elevation of the mechanism shown in Fig. 3. Fig. 9 is a detail view illustrating the adjustment of the seed-dropping mechanism to accommodate the largest of the three bevel gears. Fig. 10 shows the adjustment of the same mechanism for use in connection with the smallest of the three bevel gears.

As thus illustrated, my invention comprises a tongue or pole A provided at its rear end with an axle B upon the end portions of which are mounted the ground wheels C and C¹. The pole is also connected with the said axle by means of parallel frame members D, which have their ends brought together and secured to the pole at *d*. The two runners or furrow openers E are arranged, as usual, in advance of the two ground wheels, and are connected by the rear bar or box rail *e*. It will also be seen that these two runners are connected by means of the rotary operating or seed shaft F, as well as by means of the rock shaft G. The said rock shaft is supported in bearings secured to the frame members D, and is provided at its ends with crank arms *g* adapted to engage the forward ends of the said runners. A hand lever H is pivotally mounted upon the pole and provided with a small crank arm $h$, connected by a link $h^1$ with the bar or box rail $e$, in the manner shown. It will also be seen that this hand lever is connected by a link $h^2$ with the crank arms $h^3$ mounted upon the rock shaft G. A curved rack $h^4$ is secured to the pole and adapted to coöperate with the usual hand-operated ratchet on the hand lever in locking the latter in any desired position. With this arrangement, the runners and seed boxes or hoppers I, which latter are mounted upon the runners, can be raised and lowered bodily.

It will be seen that the operating shaft F is provided at each end with the usual fork or check-row arm $f$, which arms or forks are, however, rigidly secured to the said seed shaft. The box rail $e$ is provided with forwardly-extending arms $e^1$ upon which are mounted the usual guide rollers $e^2$ and $e^3$ for guiding the check-row wires through the said forks or check-row arms. At each side of the machine the operating shaft F is provided with three bevel pinions $e^4$, $e^5$ and $e^6$ which are of different diameters and adapted to drive the seed mechanism at different rates of speed. This shaft is also provided at one side of the machine with the mutilated gear or sprocket wheel J, the same having preferably but a few teeth, substantially as indicated in Fig. 6. In this way, said sprocket wheel has its periphery provided with teeth for only a portion of its circumference, and is left smooth for the remaining portion thereof. Each seed box has a downwardly extending spout or boot K which extends to the heel or rear portion of its allotted runner. The corn is contained in the two seed boxes I, and its discharge therefrom is controlled by any suitable mechanism operated by the seed shaft.

The bevel pinions $e^4$, $e^5$ and $e^6$ are adapted to engage the bevel gears N for the purpose of driving the rotary seed plate of each seed mechanism, which plates may be of any suitable character. Each group of bevel pinions is adjustable as a unit along the shaft, whereby any member of such unit can be caused to engage the bevel gear of the adjacent or associated seed mechanism. The bottom of each hopper is held in place by a bolt $o$, as illustrated, which bolts have thumb-nuts. Suppose that high speed is desired for the said seed-dropping mechanism, for the purpose of dropping a large number of kernels of corn in each hill. In such case, the pinions are so adjusted that the pinions $e^4$ engage the said bevel gears, as shown in Fig. 9. This is accomplished by withdrawing the pins $o^1$ and tilting up the said boxes (it being observed that the bolts $o$ permit the upward swinging motion of the hoppers) until the said pins can be reinserted in the uppermost of the three holes 1, 2 and 3, with which the upper end of each spout is provided. Then the bolt $o$ can be tightened, and the said box held firmly in place. On the other hand, should a lower speed be desired, so as to drop only a few kernels of corn in each hill, the said bevel pinions can then be adjusted in such manner as to bring the pinions $e^6$ into engagement with the said bevel gears, as shown in Fig. 10. This adjustment, it will be observed, is obtained by withdrawing the said pins $o^1$ and reinserting them in the lowest hole 3 of each spout. In this way, the quantity of seed deposited in each hill can be varied easily and quickly.

The sprocket wheel J is connected with the ground wheel at one side of the machine by the sprocket chain R, the sprocket wheel $v$ being connected with said ground wheel in any suitable manner. With this arrangement, the check-row wires are adapted to engage the forks or check-row arm $f$, and thereby rotate the shaft F just enough to bring the first tooth of sprocket wheel J into engagement with the sprocket chain, which latter has been running idle. Power is immediately communicated from the sprocket chain to the shaft F for the purpose of rotating the seed rings of the seed-dropping mechanisms, and also for the purpose of actuating the usual valves in the spouts or boots of the runners, thus discharging a quantity of seed at each side of the machine. When the shaft F has made substantially a full or complete rotation, the teeth of sprocket wheel J become disengaged from the sprocket chain, thus discontinuing the transmission of power from the ground to the seed mechanism. In this way a ground wheel is used for positively driving the seed mechanisms, but at the same time the check-row wires and arms are used for controlling such transmission of power, and consequently the planting is done in the even and uniform manner characteristic of all check-row corn planters. The accumulations of seed in the spouts or boots K are discharged when the knot in the wire strikes the check-row arm.

Each time a knot in the check-row wire engages the check-row arm or fork, the shaft F is turned just enough to bring the first tooth of the sprocket wheel J into engagement with the sprocket chain R, and then the seed mechanisms are actuated by the power communicated from the ground wheel. The knot, of course, leaves the check-row arm before the seed mechanisms are through operating, the seed shaft thus rotating until the mutilated part of the sprocket comes in contact with the chain, and the said check-row arm is thus stopped and left pointing downwardly and in position to be engaged as soon as another knot is encountered in the check-row wire. Each time a knot strikes the fork two things are accomplished—to wit, the starting of the rotary seed mechanism, and the discharge from the spout or boot of the seed or corn accumulated therein by the previous operation of the seed mechanism. Thus the knots on the check-row wire mark the positions for the hills of corn, and also mark the points at which the rotary seed mechanisms are started. Each seed mechanism continues to operate and drop the required number of seeds or kernels of corn until the smooth portion of the sprocket wheel engages the chain, and then the dropping of the seed or corn into the spouts or boots of the runners ceases instantly. The machine may then run for any required distance without causing the seed plates of the seed dropping mechanisms to operate, depending upon the distance between the knots on the check-row wire.

Obviously, the same mechanisms can be used for drilling—that is to say, for dropping the corn continuously, by simply substituting an ordinary sprocket wheel for the mutilated sprocket wheel J. In such case, the check-row arms would revolve continuously, and no check-row wires or valves would be employed. A driver's seat X can be mounted upon a seat bar T secured to the tongue.

It will be seen that with my improved arrangement the chain is never out of contact with the mutilated sprocket wheel, and that the action is certain and positive, the transmission of power for the ground wheel being interrupted at the proper time, and the reestablishing of the transmission being certain and sure as soon as the revolving fork on the said shaft is again thrown over by the check-row wire—that is to say, as soon as the sprocket wheel is again turned sufficiently to bring its teeth into engagement with the chain.

For the broader purposes of my invention, any suitable form of mutilated gearing may be used, but I prefer to employ a mutilated sprocket gearing, as I find that it has a distinct advantage over other forms, for various reasons. For example, should the chain ride up onto the end of a sprocket tooth, when the mechanism is started, no strain or breakage will occur, as the sprocket chain can have sufficient slack to enable it to do so without straining or breaking any of the parts. Furthermore, with a sprocket chain running over a mutilated sprocket gearing, I find that the desired result is obtained without interfering in any way with the raising and lowering of the planter, as the sprocket chain is flexible and readily permits such raising and lowering of the runners and seed boxes at the front of the planter. Also, and for the broader purposes of my invention, the sprocket chain can be connected in any suitable manner with the ground wheel—that is to say, it need not be directly connected therewith, as the inclusion of the axle in the medium of transmission between the ground wheel and revolving fork would, I apprehend, be within the scope and spirit of my invention; but there are certain advantages in the direct connection to the hub of the wheel, which is loose on the axle, as, for example, this permits the axle to form a part of a rigid frame between the wheels and box rail. As the rear ends of the reaches V are enlarged where they engage upon the square portion of the axle, they prevent one runner from rising without the other; and, also, the wheels are held in alinement with the runners. Except where so specified, however, I do not limit myself in the claims to a direct connection of the sprocket gearing with one of the ground wheels.

I claim:

1. A corn planter comprising seed-dropping mechanism, a sprocket wheel connected for driving said mechanism, provided with teeth for only a portion of its circumference, a ground wheel, means including a sprocket chain for connecting said ground wheel with said sprocket wheel, and a check-row device for giving the said sprocket wheel the initial rotation necessary for bringing its teeth into engagement with said sprocket chain, said sprocket wheel presenting a smooth surface over which the chain can slide to stop the operation of said mechanism.

2. A corn planter comprising seed-dropping mechanism, a mutilated gear device for transmitting motion to said mechanism, adapted automatically to stop the transmission of power to the said mechanism, a ground wheel having its hub directly connected for operating said mutilated gear device, another ground wheel, an axle on which both wheels revolve, a check-row device for giving said mechanism the initial motion necessary for starting the operation of said mutilated gear device, swinging reaches extending forward from the axle, and a frame supported on said axle.

3. A corn planter comprising a tilting seed box, a drive shaft, a bevel gear, a seed plate, and a plurality of bevel pinions mounted upon said shaft and adjustable longitudinally thereof, together with means for holding said seed box in any position necessary for permitting said bevel gear to engage any one of said bevel pinions, whereby said plate may be driven at different rates of speed.

4. A corn planter comprising a pair of seed mechanisms, an operating shaft therefor, means for driving said mechanisms directly from said shaft, a ground wheel and mutilated gear connection extending directly therefrom for positively operating said shaft, an axle on which the ground wheel turns, a check-row device for controlling the transmission of power from the ground wheel to the shaft, whereby said ground wheel and check-row device coöperate to give said shaft an intermittent rotation.

5. A corn planter provided with check-row arms pointing downward when at rest, and means including a mutilated sprocket gearing for rotating said check-row arms intermittently.

6. A corn planter comprising seed mechanism, a rotary seed shaft for operating said mechanisms, ground wheels, a power-transmitting connection directly between the shaft and a ground wheel, revolving check-row arms secured to said shaft, a squared axle for said wheels, frame members connected by the square portion of the axle, and means for raising and lowering the forward ends of said members.

7. A corn planter comprising seed mechanism, a rotary seed shaft for operating said mechanism, a revolving check-row arm on said shaft, means for driving the shaft, a discharge valve below said seed mechanism, means on said shaft for operating said valve, a mutilated sprocket gearing for driving said shaft intermittently, and a ground wheel for driving said gearing.

8. In a planter, the combination of seed mechanism, an axle, a ground wheel loose on the axle, a mutilated gearing for driving the seed mechanism from the ground wheel, said axle being excluded from the transmission of power, a check-row device for moving the mutilated gearing a distance sufficient to start the operation thereof, a ground implement back of which the seed falls, and means for raising and lowering said check-row device and implement, said gearing being adapted to permit such raising and lowering.

9. In a corn planter, the combination of a seed mechanism, an axle, a ground wheel loose on said axle, a mutilated gearing and connection by which the seed mechanism is operated intermittently from the ground wheel, said axle being excluded from the transmission of power, and a check-row device for starting the operation of the seed mechanism and gearing.

10. In a planter, the combination of seed mechanism, an axle with ground wheels mounted thereon, means including a mutilated gear wheel for driving the seed mechanism from one of the ground wheels, said axle being excluded from the transmission of power, a check-row device for moving said gear-wheel a distance sufficient to start the operation thereof, runners below said mechanism, a tongue or pole running back to connect with the axle, and means for raising and lowering the runners and mutilated gear wheel relatively to the said tongue or pole.

11. In a planter, the combination of seed mechanism, a rotary shaft for operating said mechanism, a check-row fork on said shaft, adapted to revolve with the rotation thereof, an implement back of which the seed falls, an axle, a ground wheel loose on the axle, means for driving the shaft intermittently from the ground wheel, said axle being excluded from the transmission of power, and means for raising and lowering said check-row fork and implement.

12. In a planter, the combination of seed mechanism, a ground-wheel, means including a sprocket chain and mutilated sprocket wheel for operating said mechanism from the ground wheel, a check-row device for moving the sprocket wheel a distance sufficient to start the transmission of power from the ground wheel to the seed mechanism, runners behind which the seed falls, and means for raising and lowering said runners.

13. In a planter, the combination of seed mechanism, runners behind which the seed falls, ground wheels, means including a mutilated sprocket gearing for operating the seed mechanism intermittently from a ground wheel, and means for raising and lowering said runners, said gearing adapted not to interfere with such raising and lowering.

14. A check-row corn planter provided with a seed mechanism and a rotary shaft therefor, a fork on said shaft, adapted to be engaged by a check-row wire, a ground wheel, and means including a sprocket chain for communicating to the shaft the motion of the ground wheel.

15. In a planter, the combination of a check-row fork, and means including a sprocket chain and means operated thereby for revolving said fork and automatically interrupting the motion thereof at the end of each complete revolution.

16. In a planter, the combination of a revolving check-row fork, means including a sprocket chain for revolving the fork always in one direction, and a check-row wire for engaging and starting said fork.

17. In a planter, the combination of a revolving check-row fork, a sprocket chain for driving the fork, and means intermediate the chain and fork for automatically interrupting the motion thereof at the end of each complete revolution.

18. In a planter, a revolving check-row fork, means including a ground wheel and a sprocket chain for revolving said fork always in the same direction, and a check-row wire for engaging and starting said fork.

19. In a planter, a revolving check-row fork, means including a ground wheel for revolving said fork always in the same direction, and a check-row wire for engaging and starting said fork.

20. In a planter, a seed mechanism, a mutilated sprocket wheel for operating said mechanism, a sprocket chain running over the said sprocket wheel to operate the same, and automatic means for turning the sprocket wheel sufficiently to operatively engage it with the said chain.

21. In a planter, the combination of a check-row fork, a mutilated sprocket gearing for interruptedly revolving said fork always in one direction, and a seed mechanism interruptedly operated synchronously with the said fork and by said gearing.

22. In a planter, a revolving check-row fork, and means including a mutilated sprocket gearing for interruptedly revolving said fork by the forward motion of the planter.

23. In a planter, a seed mechanism, a mutilated sprocket gearing providing a flexible intermittent driving connection between the ground and said mechanism, and automatic means for starting the operation of said mechanism after each interruption thereof.

24. In a planter, the combination of seed mechanism, a rotary seed shaft, a ground wheel, a sprocket chain driven by the ground wheel, means for connecting said shaft with the said chain, having provisions for automatically stopping the shaft while the chain continues to operate, and a check-row fork or tappet arm fixed on said shaft, adapted for turning the shaft sufficiently to start the rotation thereof by the chain.

Signed by me at Fort Madison, Iowa, this 15th day of Feby., 1906.

SAMUEL H. TINSMAN.

Witnesses:
A. HOLLINGSWORTH,
W. G. BLOOD.